(12) United States Patent
Ma et al.

(10) Patent No.: US 12,126,506 B1
(45) Date of Patent: Oct. 22, 2024

(54) CONFIGURATION AND OPERATIONAL NETWORK OBSERVABILITY USING SLIDING WINDOW FOR APPEND-ONLY TELEMETRY LOG

(71) Applicant: Cisco Technology, Inc., San Jose, CA (US)

(72) Inventors: Xueqiang (Sherman) Ma, Sunnyvale, CA (US); Zhaomin Yin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/213,512

(22) Filed: Jun. 23, 2023

(51) Int. Cl.
  *H04L 43/04* (2022.01)
  *H04L 43/067* (2022.01)

(52) U.S. Cl.
  CPC .......... *H04L 43/04* (2013.01); *H04L 43/067* (2013.01)

(58) Field of Classification Search
  CPC .......................... H04L 43/04; H04L 43/067
  See application file for complete search history.

(56) References Cited

U.S. PATENT DOCUMENTS

| | | | |
|---|---|---|---|
| 2013/0019018 A1* | 1/2013 | Rice | H04L 67/51 709/226 |
| 2013/0103658 A1 | 4/2013 | Travis | |
| 2015/0161289 A1* | 6/2015 | Branson | G06F 16/9024 707/755 |
| 2015/0356154 A1 | 12/2015 | Lin et al. | |
| 2016/0092484 A1 | 3/2016 | Finkler | |
| 2021/0200770 A1 | 7/2021 | Pandey et al. | |
| 2022/0129434 A1 | 4/2022 | Nguyen et al. | |
| 2023/0297278 A1* | 9/2023 | Rigamonti | G06F 3/0656 711/154 |

* cited by examiner

*Primary Examiner* — Emmanuel L Moise
*Assistant Examiner* — Xiang Yu
(74) *Attorney, Agent, or Firm* — Lee & Hayes, P.C.

(57) ABSTRACT

Techniques are described for storing and processing network data for responding to queries for such network data. Operational network data is separated from configuration network data so that they can be processed and stored separately. A sliding window cache is used to continually, temporarily store network data objects having time stamps falling within the time range of the sliding window cache. Network data objects stored within the sliding window cache are then moved to computer memory for storage and later retrieval. In response to a query for network data, network data objects can be retrieved from the sliding window cache and also from the computer memory based on time stamps of the network data objects and on the time range of the query.

20 Claims, 12 Drawing Sheets

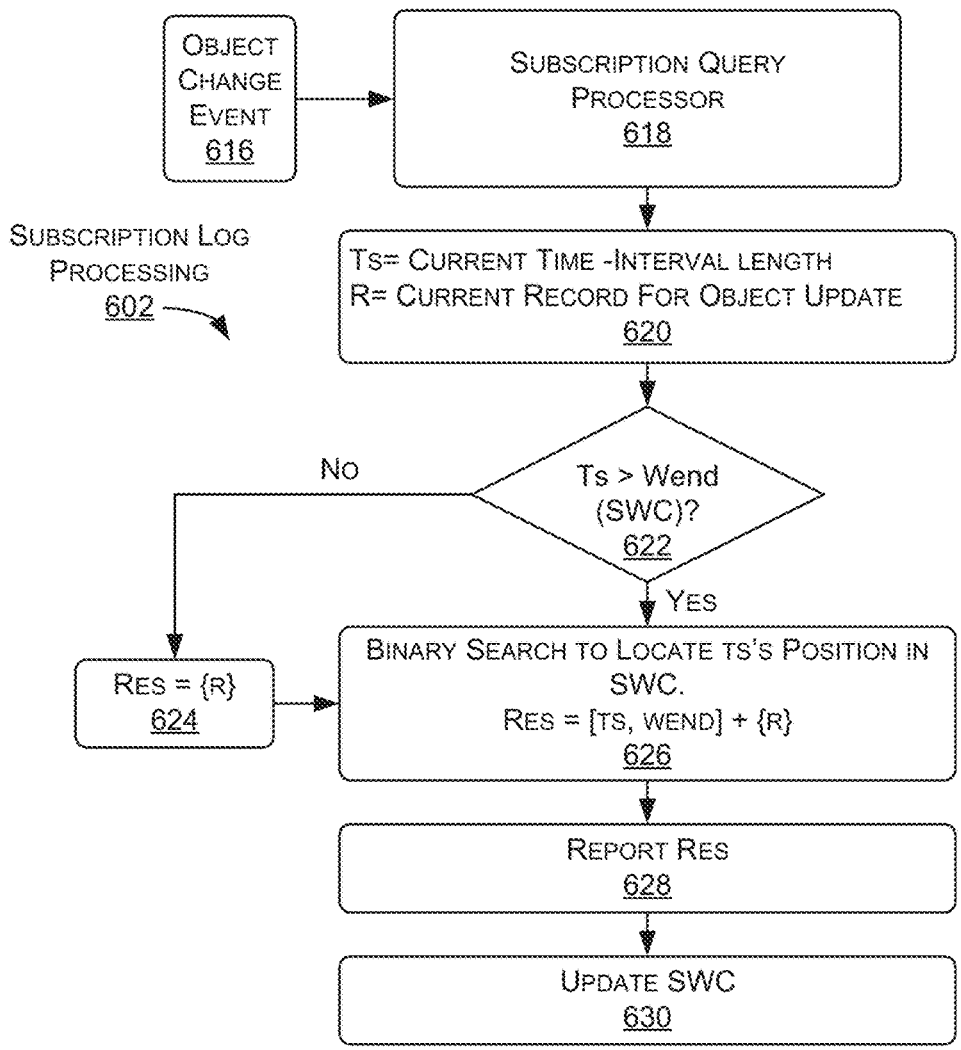
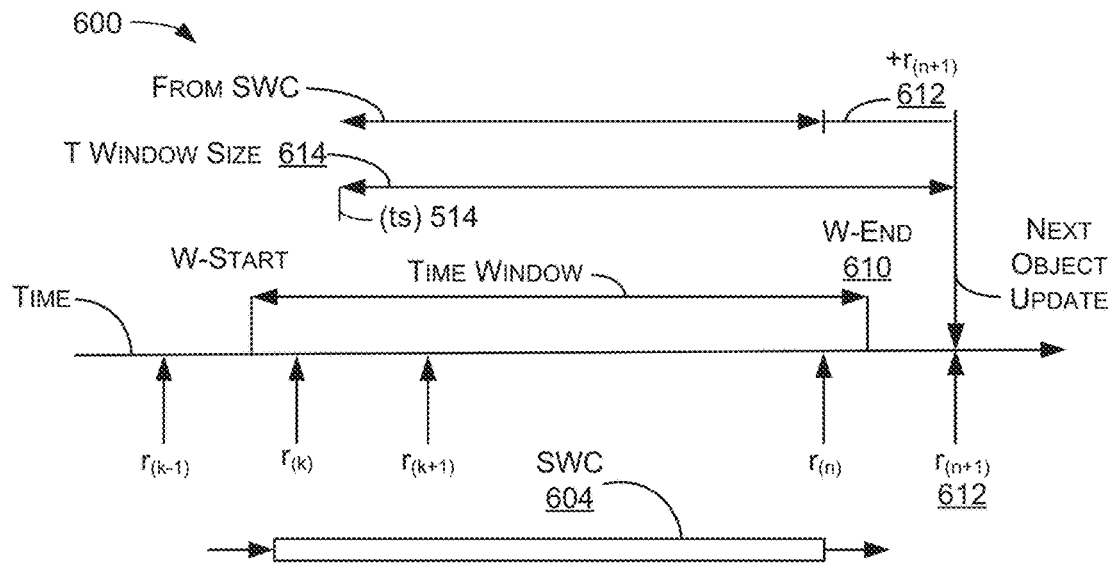
FIG. 6

CONFIGURATION AND OPERATIONAL NETWORK OBSERVABILITY USING SLIDING WINDOW FOR APPEND-ONLY TELEMETRY LOG

TECHNICAL FIELD

The present disclosure relates generally to data observability in computing, networking as well as other applications, and more particularly to techniques for separately processing configuration and operational data and using a sliding window for continuously updated operational data processing. The technique will be described using computer networking as an example, but the solution is generic and can be extended to operational data observability in other application.

BACKGROUND

Two types of data objects exist in computer networking systems, such as large network management systems. One is configuration data, which is created by end users, and the other is operational data, which is created internally in the network system. These two types of data have different characteristics. Configuration data are usually created once and only updated when a user needs to make necessary configuration changes and are, therefore, not updated as frequently as operational data is. Also, configuration data streams are not as large as operational data streams. On the other hand, operational data, such as telemetry logs, gets generated periodically and needs to be monitored constantly. In addition, the history of the operational data needs to be maintained for analytical purposes, so they are usually immutable and in the form of append-only logs. There is a much larger volume of operational data than configuration data.

Both operational data and configuration data needs to be queried for monitoring and observability purposes. However, due to its large volume, querying operational data often results in performance issues. Long query latency or even time-outs are common when attempting to query operational data, especially together with filtering and ordering options because it expensive to bring a large volume of operational data into memory to perform filtering and sorting operations.

Another problem with operational data query is to support query with subscription service (also known as query with notification). In this scenario, a user makes a query and not only wants to get the result but also wants to be notified whenever the result of this query changes in the future. This can be supported by saving these queries internally, and whenever some related objects get changed, a notification is sent to the user who made the original query with the new result via asynchronous notification mechanisms. Query with subscription is relatively easy to support for configuration data as this does not change very frequently and because configuration data itself is relatively not as large as operational data. However, subscription query poses a large challenge for operational data because operational data query is expensive and because operational data changes much more frequently. Thus, these periodically changing operational data queries trigger re-evaluation and notification, which would consume significant computing resources and seriously affect overall system performance when queries with subscription are present. There is a need for more efficient techniques for supporting queries with subscription for operational data.

In addition to performance issues, there are currently a limited number of query types, which are mostly inherited from configuration data query processes. There is a need for techniques to support new types of queries suitable for constantly changing operational data to enhance operational data observability. One example is continuous query type. Continuous query type is very useful to monitoring operational data. For instance, operational data visualization software can use a continuous query for telemetry logs and let it be invoked periodically, such as every five minutes, to update a user regarding changes. Therefore, for frequently changing operational data, continuous query if often more efficient than query with subscription and give more control over how frequently the query is re-evaluated. Therefore, there remains a need for techniques to provide an efficient way to support continuous query as a new query type for operational data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a schematic of a process for managing network configuration and operational data using a sliding window cache according to an embodiment.

DESCRIPTION OF EXAMPLE EMBODIMENTS

Overview

Figure 1:
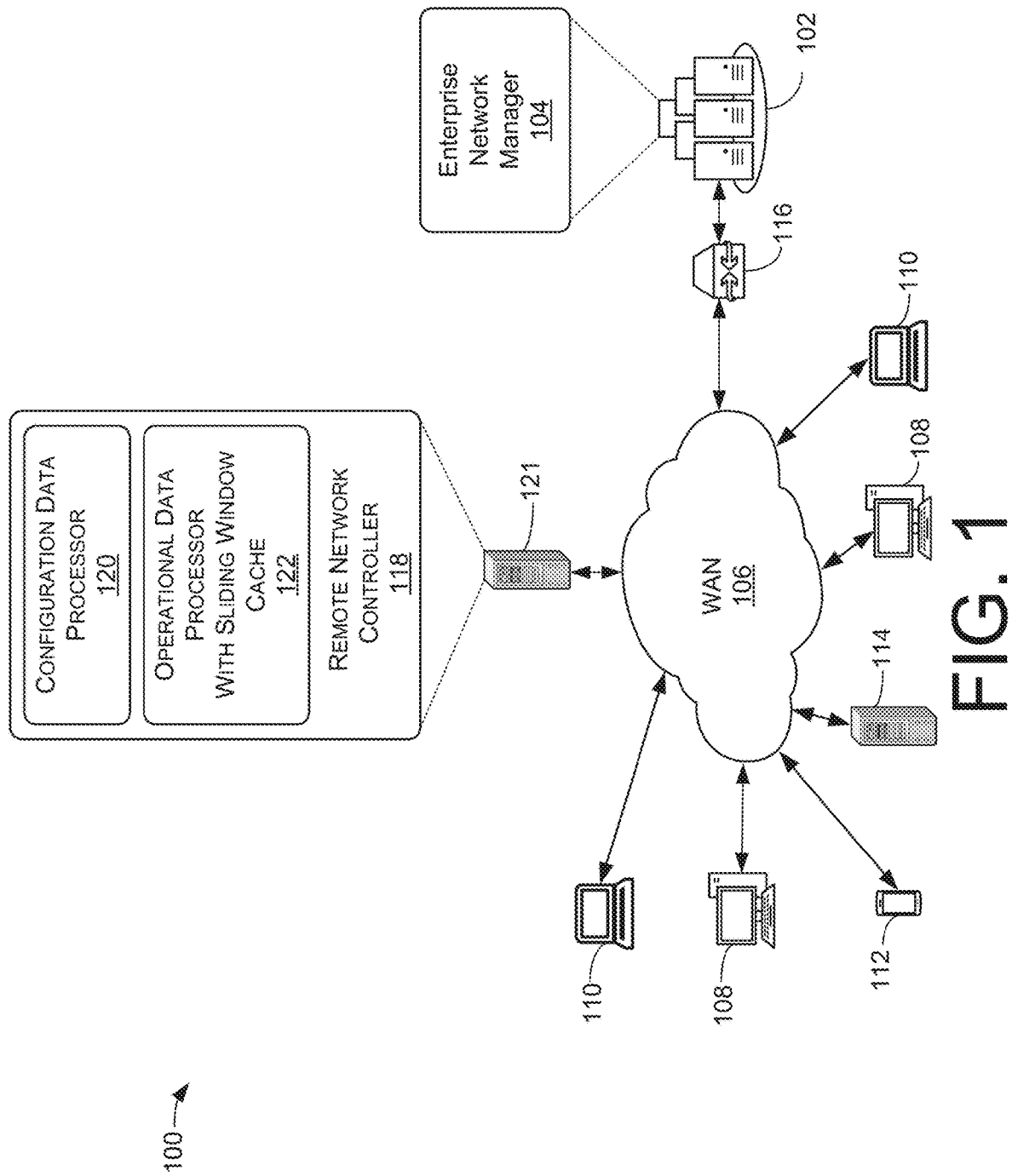
FIG. 1 illustrates a computer network architecture implementing techniques for processing network configuration and operational data according to an embodiment.

Embodiments described herein provide techniques for processing network data objects. Network data objects are received such as from a network, API Gateway, Kubernetes network, etc. The network data objects include configuration data and operational data. The configuration data and operational data are separated to generate a configuration data stream including time stamped configuration data objects and an operational data stream including time stamped operational data objects. A sliding window cache is generated, the sliding window cache having a predetermined time length. The sliding window cache is used to process operational data objects occurring within the sliding window cache based on the time stamp of the operational data objects. The cached operational data objects are stored in memory when the cached operational data objects no longer occur within the sliding window cache based on the operational data time stamp.

Additionally, the techniques described herein may be performed by a system and/or device having non-transitory computer-readable media storing computer-executable instructions that, when executed by one or more processors, performs the method described above.

Example Embodiments

In most modern network management systems, data queries are handled by REST API "GET" operations and there is no distinction made between the type of data being queried. This can cause significant query latency and system performance issues, especially when dealing with large operational data sets, as have been experienced in some widely deployed products.

Because operational data is generally much larger and updates more frequently than configuration data, it is desirable to separate operational data queries from configuration data queries and explore the unique characteristics of operational data to develop more efficient techniques and query types for this data. In a classical REST API processing path, based on whether it is a POST/PUT/DELETE/PATCH or a GET/HEAD method, the request is processed as a configuration or query operation in separate paths.

As mentioned above, compared with configuration data, operational data has much larger volumes and is updated more frequently. There is also a need to maintain the historical data for data analytics purposes. As a result, operational data queries are often the performance bottleneck in API request processing. Query performance issues are often encountered when the operational database gets large. It is common to see a query of the audit log with a prolonged wait time or time-out.

Telemetry logs are a common format for operational data. These can include access log, audit log, and event/fault log. These are by way of example, however, as telemetry logs can include other types of logs and statistics as well. An access log entry is created when a REST API request is received. It records the exact request content, the client source IP, the username and access role, the timestamp of the request, etc. An example of an access log is nginx access.log. When a configuration object is updated within a transaction, an audit log entry is created. It records which object was updated (created, modified, or deleted) and at what time. A fault/event can be defined as condition expressed by a Boolean expression over an object's properties. When an object is updated, the defined conditions are evaluated to check whether the condition value has changed. If it changes from false to true, a fault/event is raised. If it changes from true to false, then the raised fault is cleared, and a fault record entry is created as a history record. There are other types of telemetry logs as well. They are associated with a parent object class and are typically stored with timestamps in an append-only database. The database is usually large compared to the configuration data and is either frequently appended or periodically appended at a fixed interval.

FIG. 1 is a schematic illustration of a computer network architecture 100 configured to provide network data visibility to a manager of a network. The computer network architecture 100 includes an enterprise network 102 that can be managed by an Enterprise Network Manager 104. The enterprise network 102 can be a network such as a data center, business network, government network, etc. The enterprise network 102 can be connected with various remote computer devices, via a Wide Area Network (WAN) 106, such as the Internet. The remote devices can include one or more desktop computers 108, one or more laptop computers 110, one or more wireless phones 112 or similar wireless devices, one or more remote servers 114, etc. which can all be connected with the WAN 106.

In one embodiment, the enterprise network 102 can be connected with the WAN 106 by an Application Programing Interface Gateway (API Gateway 116). In order to manage the enterprise network 102 as well as the remote devices such as the desktop computers 108, laptop computers 108, remote phones 112, remote servers 114, etc., the Enterprise Network Manager 104 can employ the services of a remote, cloud-based service, such as a Remote Network Controller 118. Remote Network Controller 118 can reside on one or more remote servers 121, connected with the WAN 106.

The Remote Network Controller 118 can manage and store network data regarding devices connected with the enterprise network 102 such as devices within the network enterprise itself such as routers, switches, load balancers, etc. The Remote Network Controller can also process and store network data regarding the various remote devices connected with the enterprise network, such as the desktop computers 108, laptop computers 110, remote phones 112, remote servers 114, or any other devices connected with or associated with the enterprise network 102.

The Remote Network Controller 118 includes a Configuration Data Processor 120, and an Operational Data Processor With Sliding Window Cache for processing configuration data objects and operational data objects regarding devices connected with or associated with the enterprise network 102. The Remote Network Controller 118 separates operation configuration data and operational data so that the Configuration Data Processor 120 can process and store configuration data regarding network devices, and the Operational Data processor With Sliding Window Cache 122 can separately process and store operational data regarding devices connected with or associated with the enterprise network 102.

In one embodiment, the Remote Network Controller 118 receives network data objects from the API Gateway 116. In another embodiment, the Remote Network Controller 118 can receive network data objects from another network architecture such as a Kubernetes network architecture. The Remote Network Controller 118 separates operational data queries from configurational data queries and uses unique characteristics of operational data to develop efficient techniques and query types for this data. Based on whether a query is a POST/PUT/DELETE/PATCH or a GET/HEAD method, the query request is processed as a configuration or query operation in separate paths.

Compared with configuration data, operational data has much larger volumes and is updated more frequently, and there frequently is a need to keep historical data for data analysis purposes. Therefore, operational data queries can be a performance bottleneck in Application Programing Interface (API) request processing. This can lead to query performance issues when the operational database gets large. It is possible to experience a query of the audit log with a prolonged wait time and time-out.

Telemetry logs are a common format for operational data and can include three types of telemetry logs. An access log entry is created when a REST API request is received. It records the exact request content, the client source IP, the username and access role, the timestamp of the request, etc. An example of an access log is nginx access.log. An audit log can be created when a configuration data object is updated with a transaction. An event/fault log can be defined as conditions expressed by a Boolean expression over an object's properties. When an object is updated, the defined conditions are evaluated to check whether the condition value has changed. If it changes from false to true, a fault/event is raised. If it changes from true to false, the raised fault is cleared, and a fault record entry is created as a history record.

There are other types of telemetry logs as well. They are associated with a parent object class and are typically stored with timestamps in an append-only database. The database is usually large compared to the configuration data and is either frequently appended (such as the event log) or periodically at a fixed interval (such as statistics data).

To improve operational data query performance, the remote network controller separates the operational data query path from the configuration data path. The operational data stream is processed by the Operational Data Processor With Sliding Window Cache 122 and the configuration data path is processed by the Configuration Data Processor 120.

Figure 2:
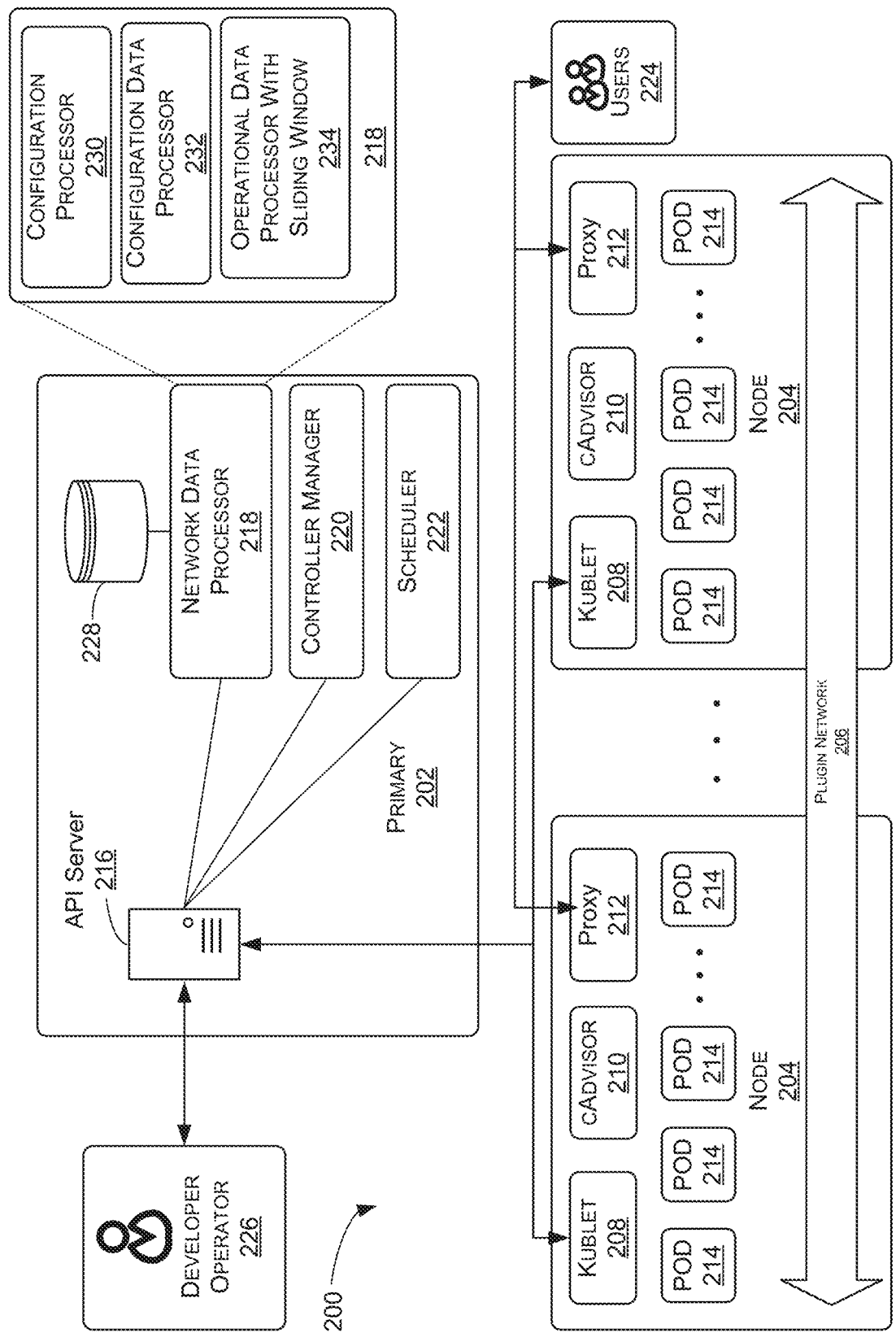
FIG. 2 illustrates a schematic of computer logic and circuitry for processing network configuration and operational data according to an embodiment.

FIG. 2 is a schematic illustration of a network architecture 200 according to another embodiment for processing network data and responding to network data queries. In one embodiment, the network architecture can be configured as a Kubernetes Architecture. Kubernetes is an open-source container deployment and management platform. It offers contain orchestration, a container runtime, container-centric infrastructure orchestration, load balancing, self-healing mechanisms, and service discovery. Kubernetes architecture, also sometimes called Kubernetes application deployment architecture or Kubernetes client server architecture, is used to compose, scale, deploy, and manage application containers across host clusters.

An environment running a Kubernetes architecture consists of some basic components including a control plane, a distributed key-value storage system for keeping the cluster state consistent (ETCD) and cluster nodes, also referred to as Kublets, worker nodes, or minions.

The network architecture 200 includes a Primary 202 that is in communication with a one or more Nodes 204. The Nodes 204 can be connected with one another by a Plugin Network 206. In one embodiment, each of the Nodes 204 can include a Kublet 208, Container Advisor (cAdvisor 210), Proxy 212 and one or more Pods 214. The description of the network architecture 200 describes a Kubernetes architecture as one possible embodiment. However, the techniques described herein can apply to various different network architectures.

The primary 202 can include an Application Programming Interface Server (API Server) 216. The API Server 216 is in communication with a Network Data Processor 218, a Controller Manager 220 and a Scheduler 222. In one embodiment, the Kublets 208 of each of the Nodes 204 are in communication with one another and also in communication with the API Server. The Proxys 212 of each of the Nodes 204 can be in communication with one another and also in communication with one or more users 224.

The control plane is the nerve center that house the cluster components of the network architecture 200 that control the cluster. It also maintains a data record of the configuration and state of all of the cluster's objects, as will be described in greater detail herein below:

The Kubernetes control plane is in constant contact with computer devices to ensure that the cluster runs as configured. Controllers respond to cluster changes to manage object states and drive the actual, observed state or current status of system objects to match the desired state or specification.

Several major components comprise the control plane, including the API Server 216, the Scheduler 222 the Controller Manager 220 and the Network Data Processor 218. These core Kubernetes components ensure containers are running with the necessary resources in sufficient numbers. These components can all run on one primary node, but many enterprises concerned about fault tolerance replicate them across multiple nodes to achieve high availability.

The front end of the Kubernetes control plane is the API Server 216. The API Server supports updates, scaling, and other kinds of lifecycle orchestration by providing Application Programming Interfaces (APIs) for various types of applications. Clients such as a Developer Operator 226 must be able to access the API Server 216 from outside the cluster, because it serves as the gateway, supporting lifecycle orchestration at each stage. In that role, clients such as the Developer Operator 226 use the API Server 216 as a tunnel to pods, services, and nodes, and authenticate via the API Server 216.

The Scheduler 222 stores resource usage data, such as in memory 228 for each of the Nodes 204, determines whether a cluster is healthy, and determines whether new containers should be deployed, and if so where they should be placed. The Scheduler 222 considers the health of the cluster generally alongside the resource demands of the Pods 214, such as CPU or memory. Then the Scheduler 222 selects an appropriate compute node and schedules the task, pod or service, taking resource limitation or guarantees, data locality, the quality of the service requirements, anti-affinity and affinity specifications and other factors into account.

The Controller Manager 220 drives the states of endpoints such as Pods 214, tokens and service accounts, Nodes 204 and replication (autoscaling). The Controller Manager, which can also be referred to as a cloud controller manager or simply controller, is a daemon which runs the Kubernetes cluster using several controller functions.

The Controller Manager 220 watches the objects it manages in the cluster as it runs the Kubernetes core control loops. It observes them for their desired state and current state via the API Server 216. If the current and desired states of the managed objects don't match, the Controller Manager 220 takes corrective steps to drive object status toward the desired state. The Controller Manager 220 also performs core lifecycle functions.

The Network Data Processor 218 provides network configuration functions and also processes network configuration and operational data to respond to queries from the Developer Operator 226 via the API Server 216. The Network Data Processor 218 is shown enlarged and in greater detail in an expanded window to the right of the Network Data Processor 218.

The Network Data Processor 218 includes a Configuration Processor 230. The Configuration Processor 230 communicates with the API Sever 216 to configure various components of the network architecture 200 as desired and requested by the Developer Operator 226. The Network Data Processor 218 also includes a Configuration Data Processor 232. The Configuration Data Processor 232 receives configuration data objects as data streams and stores the configuration data in one or more files in the memory 228. When the Developer Operator 226 sends a query via the API Server 216, the Configuration Data Processor 232 can retrieve the configuration data stored in memory 228 and send that configuration data to the API Server and Developer Operator in response to the query. The Network Data Processor 218 also includes an Operational Data Processor With Sliding Window 234. The Operational Data Processor With Sliding Window 234 collects operational data objects regarding components of the network architecture 200 and stores this data in one or more files in the memory 228 as well as in a sliding window cache which will be described in greater detail herein below. Upon receiving a query from the Developer Operator 226, via the API Server 216, the Operational Data Processor With Sliding Window 234 retrieves this data from memory 228 and from the sliding window cache and provides this data to the Developer Operator 226 via the API Server 216.

As discussed above, operational data changes much more frequently and includes much more data objects than configuration data. In order to accommodate the higher demands of managing operational data as compared with configuration data, the configuration data and operational data are split and processed by two different processors, the Configuration Data Processor 232 and the Operational Data Processor with Sliding Window 234. Also, in order to improve efficiency of processing the large streams of operational data, the Operational Data Processor With Sliding Window 234 employs a sliding window cache of a predetermined time length to continuously process the operational data and temporarily store this data in the sliding window cache before moving the operational data to memory 228. The sliding window cache (not shown in FIG. 2) will be described in greater detail herein below: In one embodiment, the Operational Data Processor With Sliding Window Cache stores operational data in various files which can include an Audit-Log, an Event-Log, and an Access Log, which will be described in greater detail herein below such as with reference to FIG. 4.

Figure 3:
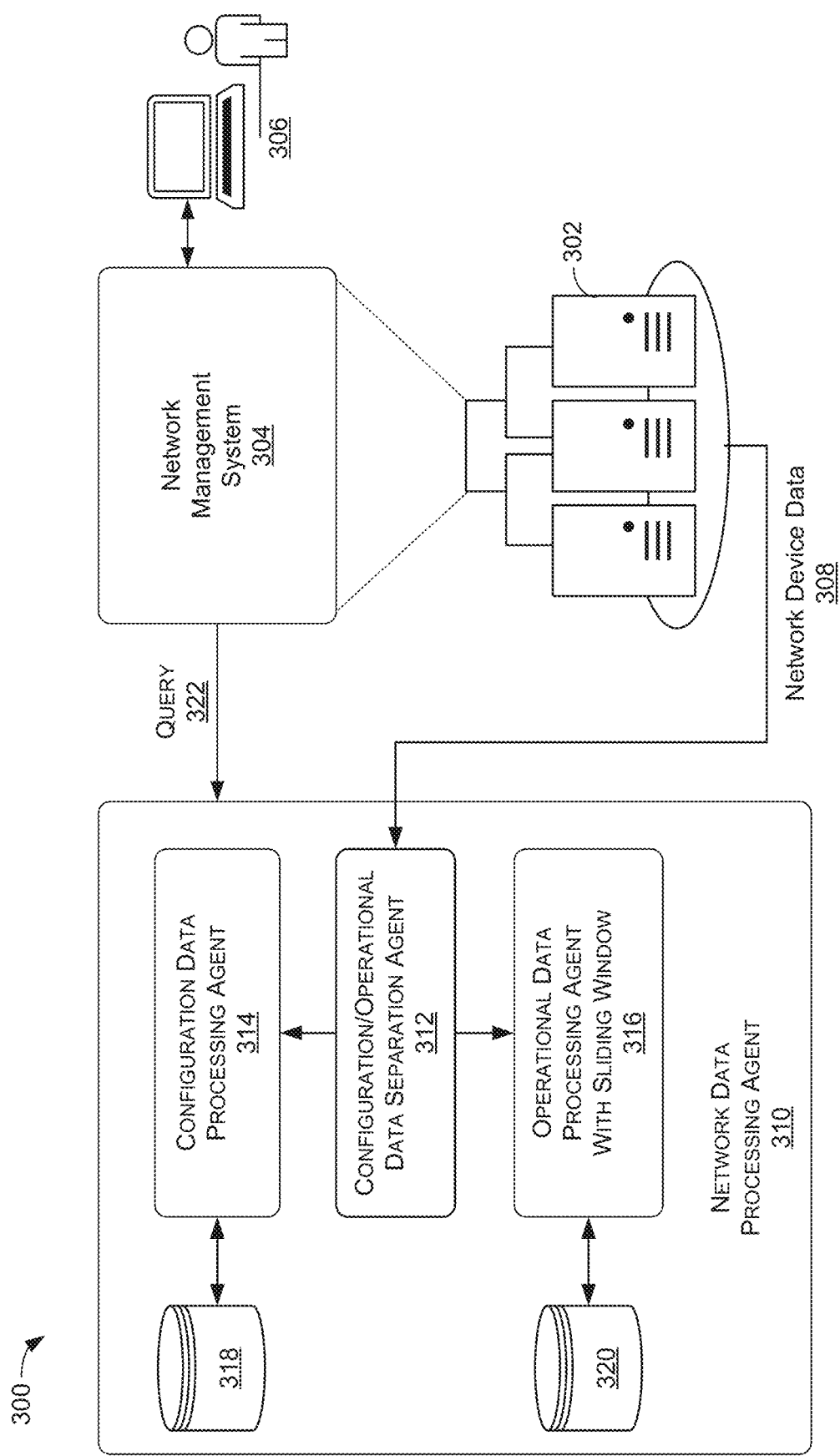
FIG. 3 illustrates a schematic of computer logic and circuitry for processing network configuration and operational data according to another embodiment.

FIG. 3 is a schematic illustration of a system 300 for processing network data and responding queries for network data. A computer network 302 is managed by a Network Management System 304. In some embodiments, the Network Management System 304 can be operated and maintained by a network manager 306. The computer network 302 can be, for example, an enterprise network or data center. The computer network 302 can be affiliated with a business, government entity, campus, etc. The Network Management System 304 can be a remote, cloud-based management system, or could be a system native to the computer network 302 such as residing one or more servers of the computer network 302.

The computer network 302 generates Network Device Data 308, which is delivered to a Network Data Processing Agent 310. The Network Device Data 308 can include configuration data as well as operational data regarding various devices of the computer network 302. The various devices can include routers, switches, load balancers, servers, software-based virtual devices or tools, etc.

The Network Device Data 308 is processed by a Configuration/Operational Data Separation Agent 312, which separates the configuration data from the operational data. The Configuration/Operational Data Separation Agent sends separated configuration data to a Configuration Data Processing Agent 314 and sends separated operational data to an Operational Data Processing Agent With Sliding Window 316.

The Configuration Data Processing Agent 314 processes the separated configuration data objects and store this operational data in one or more databases 318, which may reside in computer memory such as magnetic memory, solid state memory, CPU, etc. The Operational Data Processing Agent With Sliding Window 316 processes the operational data and stores the results in one or more databases 320, which can include computer memory such as magnetic memory, solid state memory, CPU storage, etc. The Operational Data Processing Agent With Sliding Window 316 employs a sliding window cache to temporarily store operational data on a sliding window basis before storing the operational data in the database 320. The sliding window cache allows operational data streams to be continually processed and recorded in real-time, making the operational data available for queries such as from the Network Management System 304.

The Network Management System 304 can send a query 322 to the Network Data Processing Agent 310. The query 322 can be a query for configuration data and operational data regarding the network 302. Optionally, the query 322 can be a query for only operational data or only configuration data. The Network Data Processing Agent 310 can retrieve the configuration data from the database 318 and can retrieve the operational data from the database 320 to respond to the query. In addition, to retrieving operational data from the database 320, operational data held within the sliding window cache can be retrieved from the sliding window cache to respond to the query 322. In this way, up to date operational data can be provided to the Network Management System 304 in response to the query 322 even when the operational data include large streams of constantly updated operational data.

Figure 4:
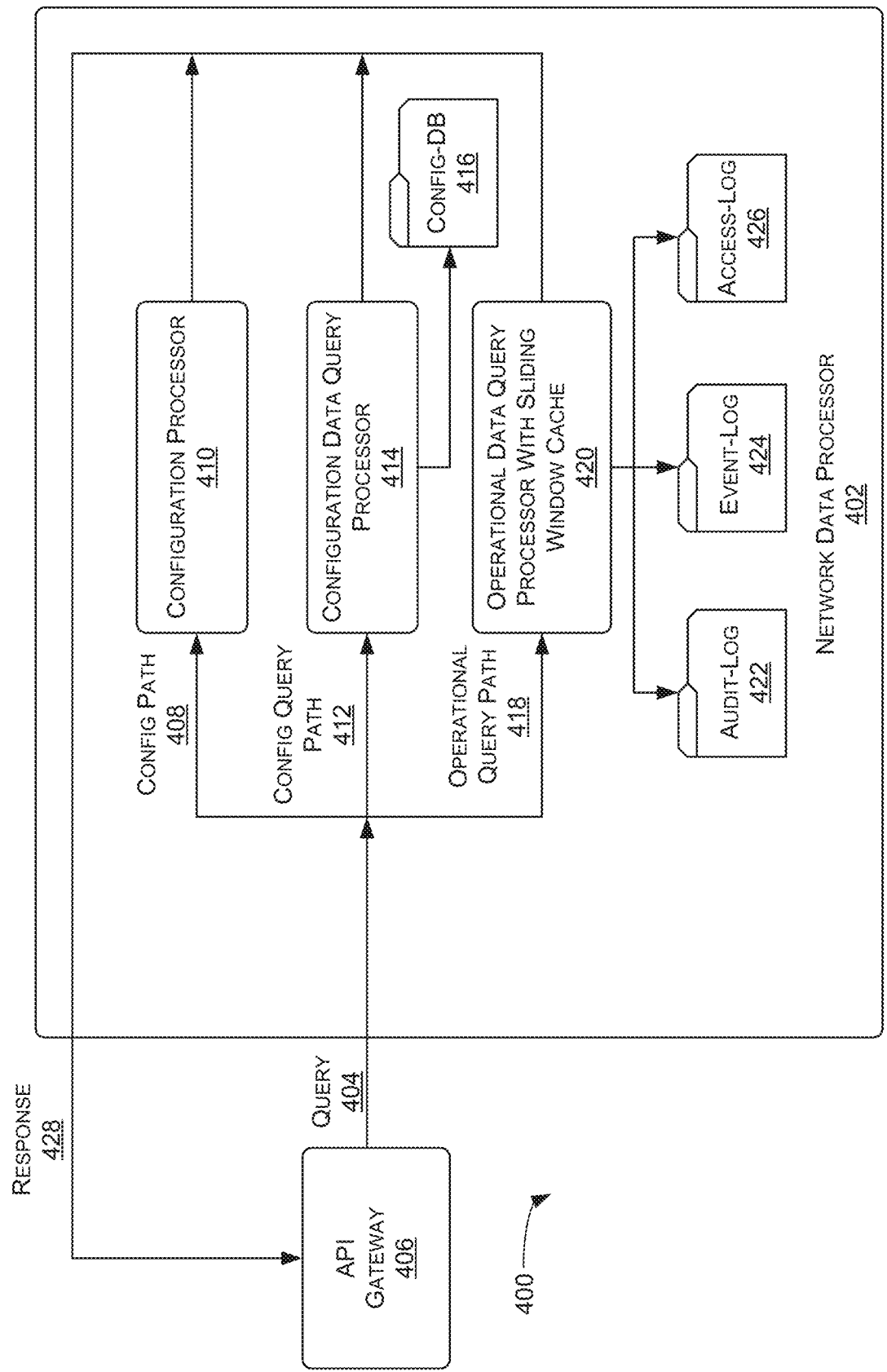
FIG. 4 illustrates a schematic of computer logic and circuitry for processing and storing network data and responding to a query for network data.

FIG. 4 is schematic illustration of a process 400 for managing configuration network data and operational network data. A Network Data Processor 402 receives a Query 404 for network data. In one embodiment, the query 404 can be received from an API Gateway 406. However, the Query 404 could be received from some other device or devices, such as a network manager, network controller, Kubernetes network device, etc.

The Network Data Processor 402 has three processing paths. A Configuration Path 408 leads to a Configuration Processor 410. The Configuration Processor 402 includes logic and/circuitry for configuring devices of a network architecture. The configuration of the devices can be according to instructions or rules from the API Gateway 406 or from a network controller (not shown).

The Network Data Processor 402 also includes a Configuration Query Path 412 which leads to a Configuration Data Query Processor 414. The Configuration Data Query Processor 414 processes configuration data which has been separated from operational data. The processed configuration data can be stored in a Configuration Database 416. Because configuration data streams are not as large as operational data streams and configuration events do not change as frequently as operational data events the configuration data can be processed and stored by standard data management techniques.

The Network Data Processor 402 also has an Operational Data Query Path 418 that leads to an Operational Data Query Processor With Sliding Window Cache 420. The Operational Data Query Processor With Sliding Window Cache 420 processes operational data and temporarily stores the operational data in a sliding window cache of a predetermined time duration. The sliding window cache, which will be described in greater detail herein below, allows large streams of operational data to be efficiently stored in real time. When the time frame of the sliding window cache moves in time so that the data is no longer within the window, the data stored in the sliding window cache is moved to one or more databases.

In one embodiment, the operational data can be stored in various database files that can include an Audit-Log 422 database, an Event-Log 424 database, and an Access Log 426 database. The Audit-Log 422, Event-Log 424 and Access Log 426 can be stored in computer memory such as magnetic memory, solid state memory, CPU memory, Application Specific Integrates Circuity (ASIC) memory, etc. Each data object of the operation data stream has a time stamp (ts) to record its location in time.

The Network Data Processor 402 can receive a query for network data falling within a certain time duration such as, for example, the last hour, last 24 hours, etc. based on the time stamps of data objects. The Configuration Data Query Processor 414 can retrieve data configuration data having a time stamp falling within the requested time frame from the Configuration Database 416. The Operational Data Query Processor With Sliding Window Cache 420 can also retrieve operational data having a time stamp falling within the query time frame from one or more of the databases, Audit-Log 422, Event-Log 424 and Access-Log 426. However, some of the requested operational data objects may still be stored in the sliding window cache. If operational data objects fall within the requested query time frame, those data objects along with the data objects retrieved from the databases, will be sent to the API Gateway 406 (or other requesting entity) as a Response 428. If any configuration data retrieved from the Config-DB 416 also falls within the query time frame, then that configuration data can also be provided with the Response 428. The retrieval configuration and operational data from the various databases and sliding cache, and Response 428 can be performed according to techniques that will be described herein below.

Figure 5:
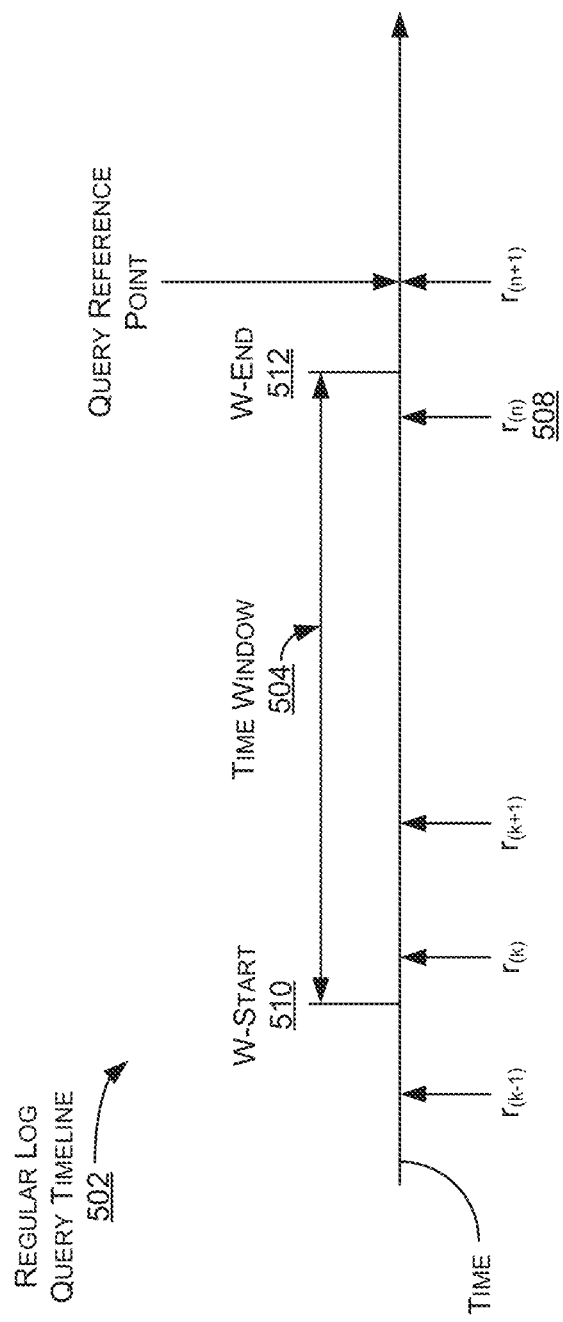
FIG. 5 illustrates schematic of a timeline for processing network data.

FIG. 5 is a schematic illustration of a timeline for processing a Regular Log Query Timeline 502. FIG. 5 shows a response to a log query of a time range or Time Window 504. For example, the query could be requesting network data log entries for a time window of one hour. In that case the Time Window 504 would be one hour.

In that case all log records from $r_{(k)}$ to $r_{(n)}$ would be retrieved within a window of 1 hour (Time Window 504), between W-Start 510 and W-End 512. When W-End 512 is set to the current time, it becomes a query for the logs from the last 1 hour (Time Window 504). Techniques are then designed for the log database table using an ID as a primary key such that the ID can be mapped monotonically to the log entry's timestamp field. If it is an existing log database, then an index can be created using the ID. Since each log database table is always associated with a specific parent object class, this parent object class's class ID can be appended with a running number starting from 1. This will guarantee that the resulting ID is unique. Also, since each log database is append-only, both the ID and timestamps will increase when new entries are added, thus the ID can be 1-1 mapped to the timestamp field when high-precision timestamps are used. This means that when given W-Start 510 and W-End 512, a binary search can be used to locate the ID of the first record with a timestamp greater than or equal to W-Start 510, and the ID of the last record with a timestamp less than or equal to W-End 512 and fetch all records between the two IDs (inclusively), this is the correct result for the query. The query can be evaluated in log(N) times, significantly faster than the regular query, which is in linear time complexity O(N). For example, in the case of a large audit log database with 1 million records, the correct ID can be located with up to 20 comparisons at most.

Furthermore, the last retrieved Time Window 504 of the results for each log database table will be saved. This acts as a sliding window cache (SWC), moving forward on the time dimension each time a new query for the last Time Window 504 on the log database table. This turns out to be very beneficial to speeding up log queries when the future query's timestamp interval overlaps with the timestamp interval in the corresponding sliding window cache.

A subscription log query presents special challenges. With a subscription log service, a query is generated every time a new data object even occurs. This presents a challenge in providing query support for telemetry logs because the telemetry log is getting frequently updated, resulting in repeatedly triggering the expensive log query operation on large log databases.

FIG. 6 illustrates a solution for efficiently responding to subscription log queries. FIG. 6 show a timeline 600 illustrating techniques for processing data subscription data queries. FIG. 6 also shows a flowchart illustrating a process for Subscription Log Processing 602. When the next parent object gets updated, the subscription query can be reevaluated again. A completely new query evaluation transaction can be saved by using a Sliding Window Cache (SWC 604). The timestamp (ts) 514 can be calculated by subtracting the duration of the SWC 604 (e.g., 1 hour) from the current time. If the timestamp (ts) 514 is smaller than the end of the SWC 604, this means the new time window overlaps with the SWC 604. The records between the interval $r_{(k)}$ 608 and W-End 510 can be re-used, and then insert the record associated with the current update, which is $r_{(n+1)}$ 612. The SWC 604 is also maintained in increasing order of timestamps in memory. The record associated with the timestamp (ts) 514 can be located via a binary search in O(log \SWC\) where \SWC\ denotes the number of records in the SWC 604 and perform one additional insertion operation.

If ts 514 is larger than W-End 610, then that means the new window has no overlap with the SWC 604. In this case we do not need to perform a new regular query evaluation, because the subscription query is triggered by each parent update. So, if ts 514 is larger than W-End 610, this means there has been no update within the time window size 614. Therefore, only a single log entry associated with $r_{(n+1)}$ 612 needs to be returned. In this way, the subscription query becomes very efficient and simple.

The flowchart of FIG. 6 illustrates process steps for Subscription Log Processing 602. In the subscription service the query is triggered by an Object Change Event 616. The new query is processed by a Subscription Query Processor 618. Then, in an operation 620, a determination is made as to whether Ts is equal to the current time interval length and whether R is equal to the current time record for the object update. In a decision operation 622 a decision is made as to whether the time stamp Ts is greater than W-End 610. If no, then the response value is reset, (resp={r}) 624. If yes, ts is larger than W-End 610, then in an operation 626 a binary search is performed to locate the time stamps position in the SWC 604, and response is set to (response=[ts, W-End]+{r}) 626. A response can then be reported 628. The SWC 604 is then updated 630.

Figure 7:
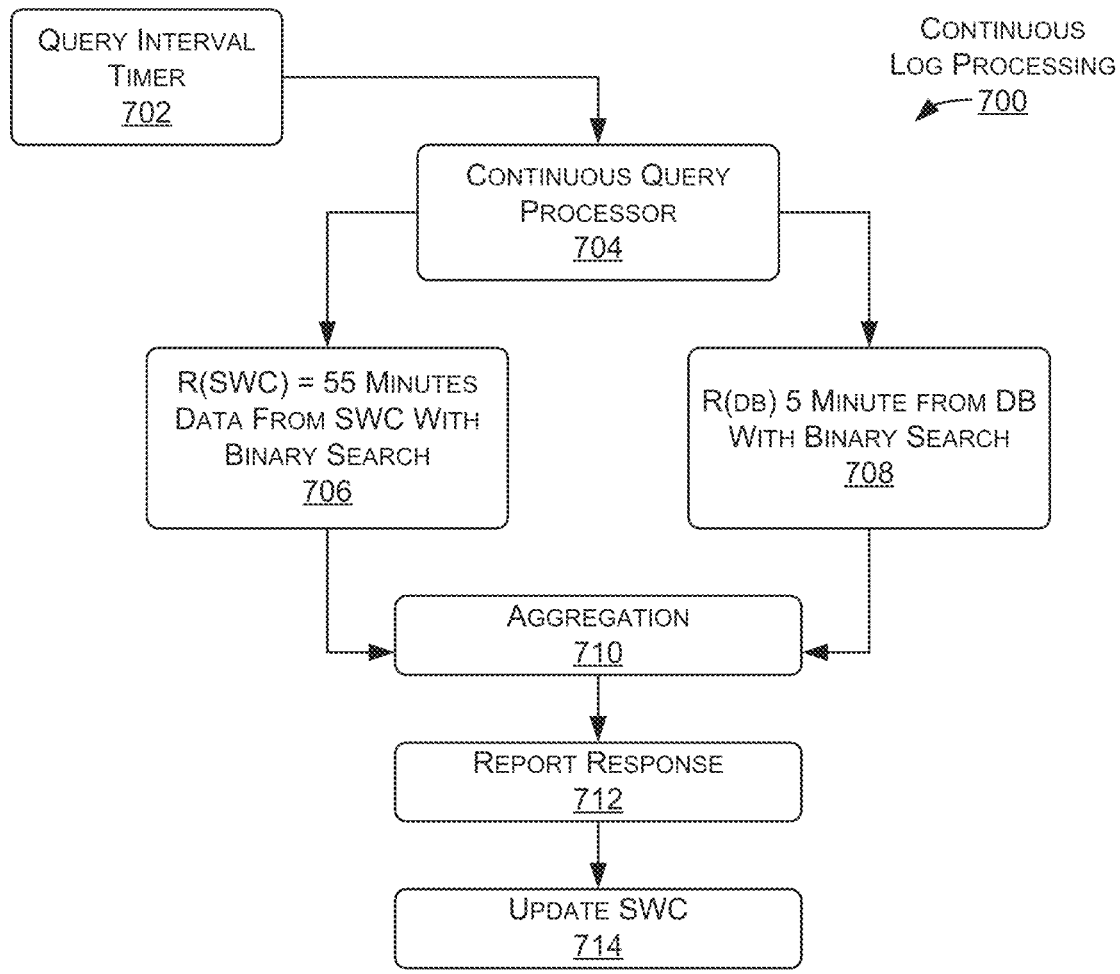
FIG. 7 illustrates a schematic of a process for managing network configuration and operational data using a sliding window cache to provide network data to a subscription client.

FIG. 7 shows illustrates a process flow for providing Continuous Log Processing 700. Continuous Query is a query type which is useful for operational data because operational data gets frequently updated. This makes it desirable for the data to be continuously monitored. For example, if there is a Graphic User Interface (GUI) window displaying a tenant's last one hour of audit log entries, besides using subscription query to monitor each change, continuous query can be used to evaluate the last one-hour data every five minutes. This would save network and CPU resources in the case of rapid data changes.

FIG. 7 demonstrates techniques to support efficient evaluation of continuous query. At predetermined time intervals (e.g., every five minutes), the continuous query will be re-evaluated, but the last 55 minutes of cached data in the corresponding SWC can be re-used, and a query can be performed with the last five minutes granularity in a similar way as described in the regular query with a time range in O(log N). This can be concatenated with the last 55 minutes of data from the SWC and returned to the user.

FIG. 7 illustrates a process for Continuous Log Processing 700. The process includes initiating a query based on a Query Interval Timer 702. In a continuous process log processing, a query is performed at regular intervals. The Query Interval Timer 702 initiates a query each time this interval has expired, such as for example every 5 minutes. A Continuous Query Processor 704. The Continuous Query Processor 704 splits the process flow into two paths. Along a first path 706, data is retrieved from the Sliding Window Cache (SWC) using a binary search. This search can include a timespan of, for example, 55 minutes. The Continuous Query Processor 704 also sends the query along a second path 708 where data is retrieved from a database. This search can include a timespan of, for example 5 minutes to include data not included in the SWC. The data from 706, 708 is then aggregated (Aggregation 710), combining the data retrieved from the database with the data from the SWC. The aggregated data is then reported as a response to the query 712. Also, the Sliding Window Cache (SWC) is updated with the aggregated data 714.

Figure 8:
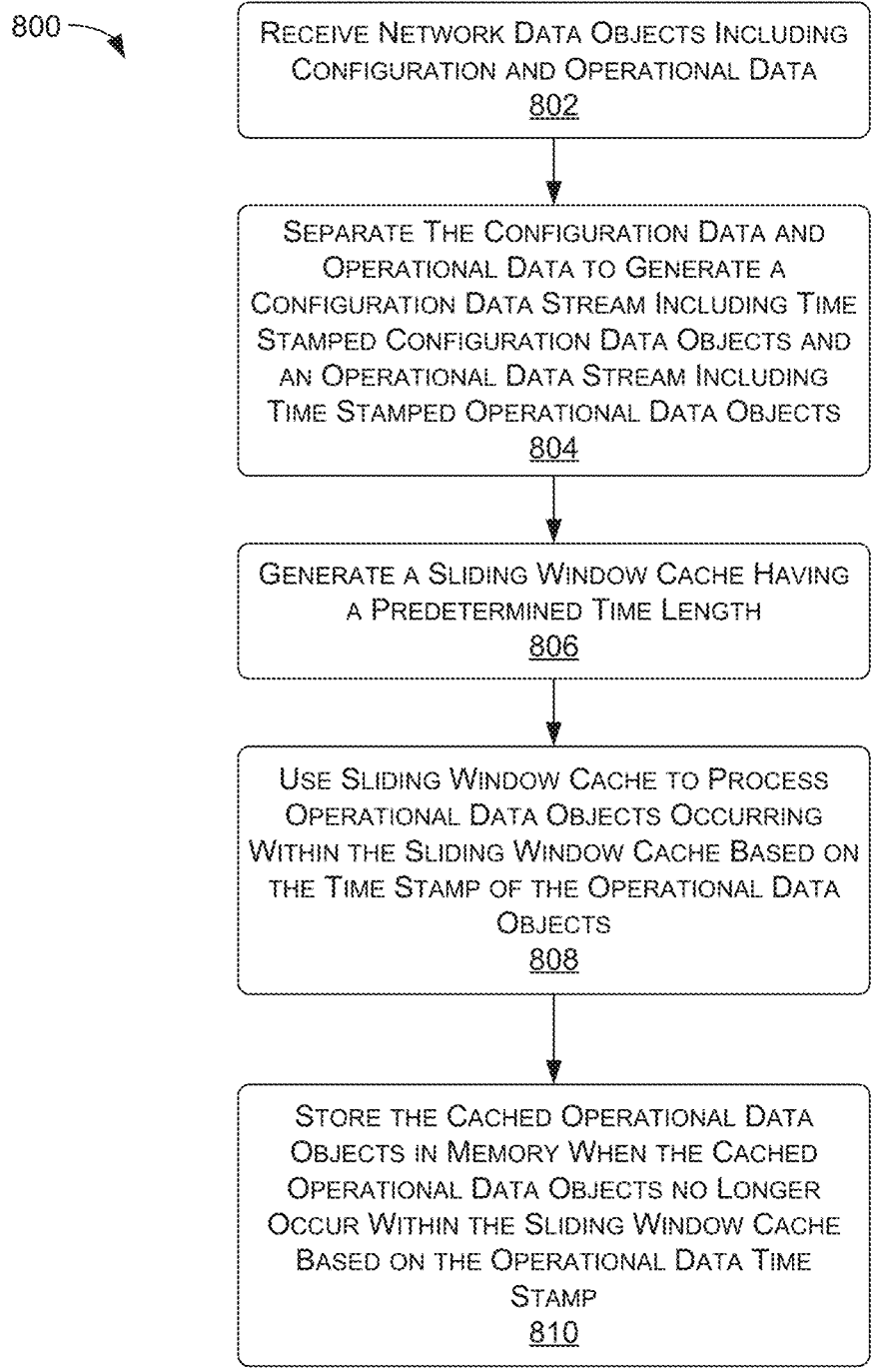
FIG. 8 illustrates a flowchart of a method according to an embodiment for processing configuration and operational network data.

FIG. 8 illustrates a flow diagram of an example method 800 that illustrates aspects of the functions performed at least partly by the devices in the network architecture as described in FIGS. 1-7. The logical operations described herein with respect to FIG. 8 may be implemented (1) as a sequence of computer-implemented acts or program modules running on a computing system and/or (2) as interconnected machine logic circuits or circuit modules within the computing system. By way of example, the operations can be performed by one or more data management systems or network controllers such as the Remote Network Controller 118 of FIG. 1 and server or servers 121 of FIG. 1, Network Data Processing Agent 310 of FIG. 3, Network Data Processor 402 of FIG. 4, etc.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 8 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

With reference to FIG. 8, the method 800 includes an operation 802 in which network data objects are received. The network data objects include configuration data and operational data regarding devices of a computer network architecture. The network data objects can be received from a device or system, such as an Application Programming Interface gateway (API Gateway). In other embodiments the network data objects can be received by one or more devices of a network architecture such as a Kubernetes network architecture.

In an operation 804, the configuration data and the operational data are separated in order to generate a configuration data stream including time stamped configuration data objects and an operational data stream including time stamped operational data objects. In operation 806, a sliding window cache is generated. The sliding window cache is generated to have a predetermined time length or duration. In an operation 808, the sliding window cache is used to process operational data objects occurring within the sliding window cache based on the time stamp of each of the operational data objects. The sliding window cache can also be used to process configuration data objects. The sliding window cache provides temporary storage of data objects falling within the time range of the sliding window cache which moves in time to continually record data objects having time stamps falling within the time frame of the sliding window cache.

In an operation 810, operational data objects are stored in memory when the cached operational data objects no longer occur within the sliding window cache based on the time stamp of the operational data objects. The data objects are moved from the sliding window cache to computer memory based on the time stamp of each data object and the time frame of the sliding window cache. The computer memory can be magnetic memory solid state memory, CPU memory, Application Specific Integrated Circuity (ASIC) memory, etc. In response to a query, such as from a customer, network data can be retrieved from the sliding window cache and non-cached data objects can be retrieved from the computer memory to reply to the query. The separation of the operational data from configuration data as well as the use of the sliding window cache greatly improves efficiency of the processing and storage of network data.

Figure 9:
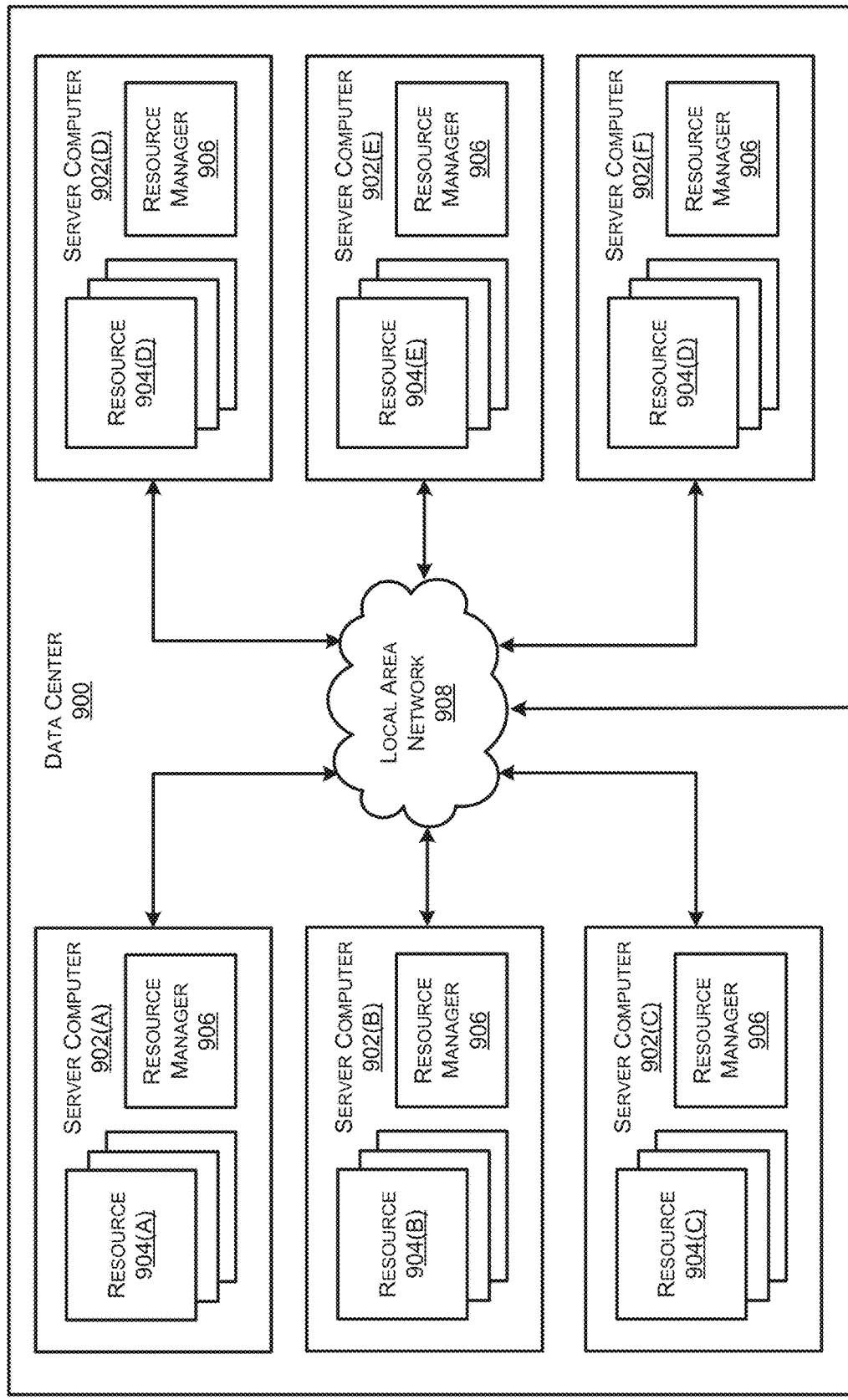
FIG. 9 illustrates a computing system diagram illustrating a configuration for a data center that can be utilized to implement aspects of the technologies disclosed herein.

FIG. 9 is a computing system diagram illustrating a configuration for a data center 900) that can be utilized to implement aspects of the technologies disclosed herein. The example data center 900 shown in FIG. 9 includes several server computers 902A-902F (which might be referred to herein singularly as "a server computer 902" or in the plural as "the server computers 902") for providing computing resources. In some examples, the resources and/or server computers 902 may include, or correspond to, the any type of networked device described herein. Although described as servers, the server computers 902 may comprise any type of networked device, such as servers, switches, routers, hubs, bridges, gateways, modems, repeaters, access points, etc.

The server computers 902 can be standard tower, rackmount, or blade server computers configured appropriately for providing computing resources. In some examples, the server computers 902 may provide computing resources 904 including data processing resources such as VM instances or hardware computing systems, database clusters, computing clusters, storage clusters, data storage resources, database resources, networking resources, and others. Some of the server computers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 900 can also be configured to provide network services and other types of services.

In the example data center 900 shown in FIG. 9, an appropriate network 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 900, between each of the server computers 902A-902F in each data center 900, and, potentially, between computing resources in each of the server computers 902. It should be appreciated that the configuration of the data center 900 described with reference to FIG. 9 is merely illustrative and that other implementations can be utilized.

In some examples, the server computers 902 may each execute one or more application containers and/or virtual machines to perform techniques described herein.

In some instances, the data center 900 may provide computing resources, like application containers, VM instances, and storage, on a permanent or an as-needed basis. Among other types of functionality, the computing resources provided by a cloud computing network may be utilized to implement the various services and techniques described above. The computing resources 904 provided by the cloud computing network can include various types of computing resources, such as data processing resources like application containers and VM instances, data storage resources, networking resources, data communication resources, network services, and the like.

Each type of computing resource 904 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 904 not mentioned specifically herein.

The computing resources 904 provided by a cloud computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below with regard to FIG. 10.

Figure 10:
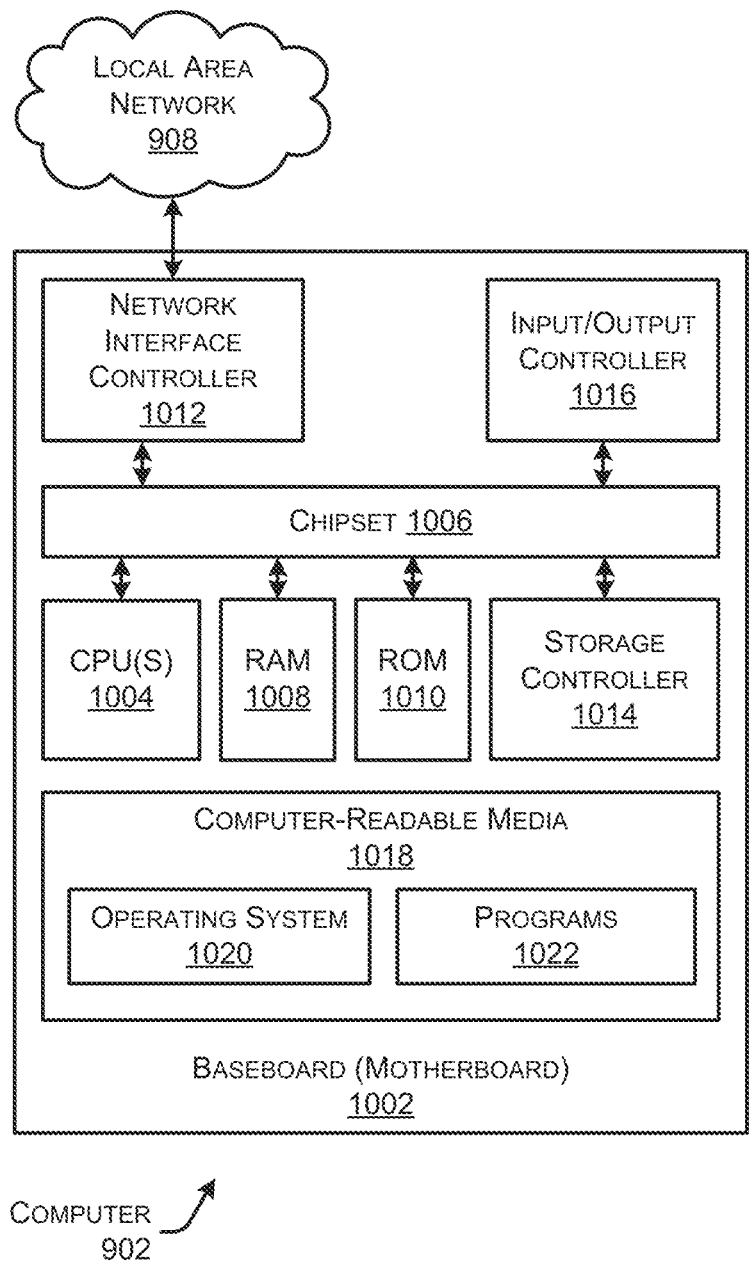
FIG. 10 is a computer architecture diagram showing an illustrative computer hardware architecture for implementing a computing device that can be utilized to implement aspects of the various technologies presented herein.

FIG. 10 shows an example computer architecture for a server computer 902 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The server computer 902 may, in some examples, correspond to a physical server, and may comprise networked devices such as servers, switches, routers, hubs, bridges, gateways, modems, repeaters, access points, etc.

The server computer 902 includes a baseboard 1002, or "motherboard," which is a printed circuit board to which a multitude of components or devices can be connected by way of a system bus or other electrical communication paths. In one illustrative configuration, one or more Central Processing Units (CPUs 1004) operate in conjunction with a chipset 1006. The CPUs 1004 can be standard programmable processors that perform arithmetic and logical operations necessary for the operation of the server computer 902.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the server computer 902. The chipset 1006 can further provide an interface to a computer-readable storage medium such as a read-only memory ("ROM") 1010 or non-volatile RAM ("NVRAM") for storing basic routines that help to startup the serve computer 902 and to transfer information between the various components and devices. The ROM 1010 or NVRAM can also store other software components necessary for the operation of the server computer 902 in accordance with the configurations described herein.

The server computer 902 can operate in a networked environment using logical connections to remote computing devices and computer systems through a network, such as the network 908. The chipset 1006 can include functionality for providing network connectivity through a NIC 1012, such as a gigabit Ethernet adapter. The NIC 1012 is capable of connecting the server computer 902 to other computing devices over the network 908. It should be appreciated that multiple NICs 1012 can be present in the server computer 902, connecting the computer to other types of networks and remote computer systems.

The server computer 902 can be connected to a storage device 1018 that provides non-volatile storage for the computer. The storage device 1018 can store an operating system 1020, programs 1022, and data, which have been described in greater detail herein. The storage device 1018 can be connected to the server computer 902 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 902 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the server computer 902 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 902 can further read information from the storage device 1018 by detecting the physical states or characteristics of one or more particular locations within the physical storage units.

In addition to the mass storage device 1018 described above, the server computer 902 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 902. In some examples, the operations performed by devices in a distributed application architecture, and or any components included therein, may be supported by one or more devices similar to server computer 902. Stated otherwise, some or all of the operations performed by the network architecture 100 or 200 and or any components included therein, may be performed by one or more server computer 902 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 902. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 902.

In one embodiment, the storage device 1018 or other computer-readable storage media is encoded with computer-executable instructions which, when loaded into the computer 902, transform the computer from a general-purpose computing system into a special-purpose computer capable of implementing the embodiments described herein. These computer-executable instructions transform the computer 902 by specifying how the CPUs 1004 transition between states, as described above. According to one embodiment, the computer 902 has access to computer-readable storage media storing computer-executable instructions which, when executed by the computer 902, perform the various processes described above with regard to FIGS. 1-8. The computer 902 can also include computer-readable storage media having instructions stored thereupon for performing any of the other computer-implemented operations described herein.

The server computer 902 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 902 might not include all of the components shown in FIG. 10, can include other components that are not explicitly shown in FIG. 10, or might utilize an architecture completely different than that shown in FIG. 10.

As described herein, the server computer 902 may comprise one or more of a router, load balancer and/or server. The server computer 902 may include one or more CPUs 1004, configured to execute one or more stored instructions. The CPUs 1004 may comprise one or more cores. Further, the computer 902 may include one or more network interfaces configured to provide communications between the server computer 902 and other devices, such as the communications described herein as being performed by the router, load balancer and/or server. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure for providing a distributed application load-balancing architecture that is capable of supporting multipath transport protocol. That is, the server computer 902 may comprise any one of the routers, load balancers, and/or servers. The programs 1022 may comprise any type of program that cause the server computer 902 to perform techniques for communicating with other devices using any type of protocol or standard usable for determining connectivity.

Figure 11:
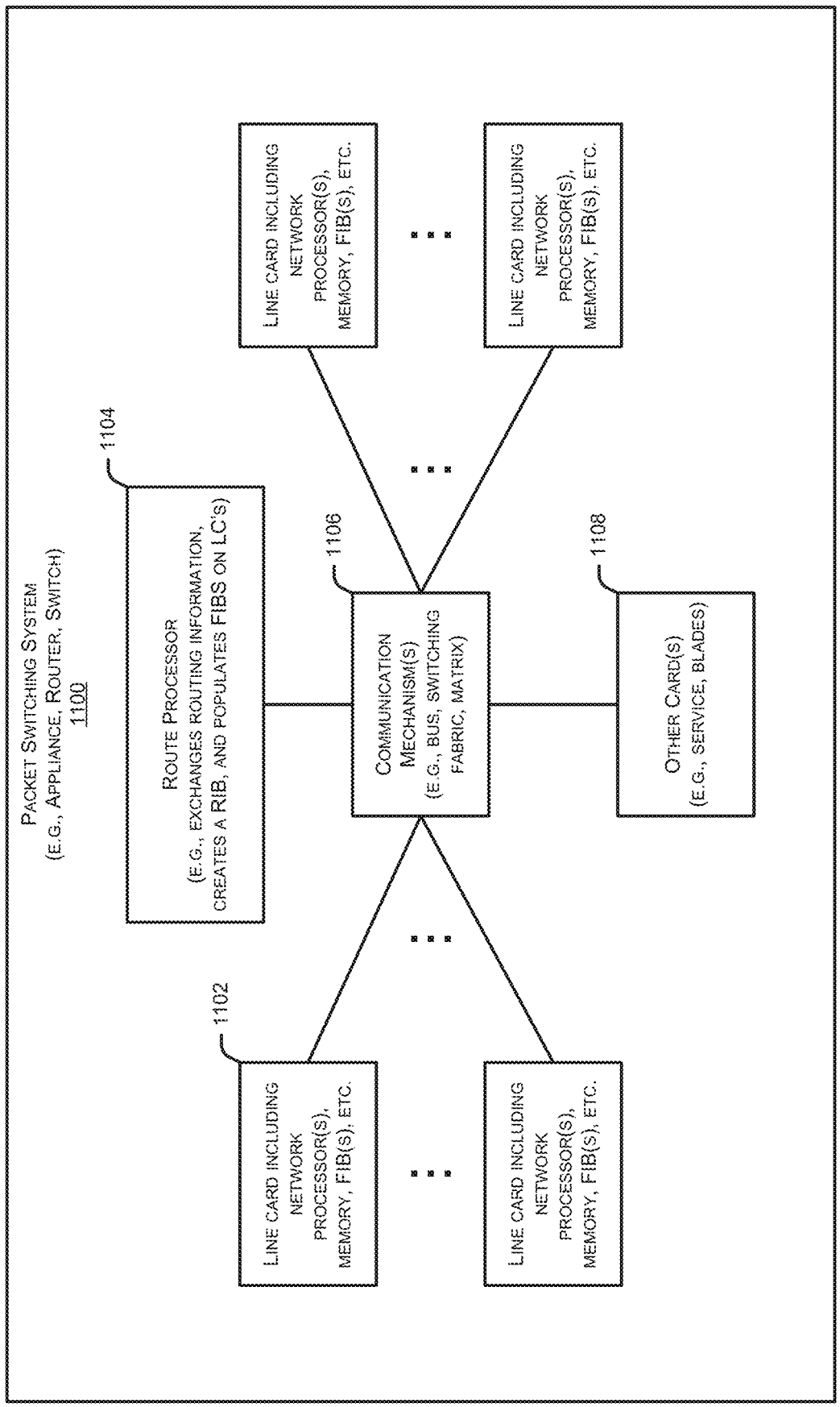
FIG. 11 illustrates a block diagram illustrating an example packet switching system that can be utilized to implement various aspects of the technologies disclosed herein.

FIG. 11 illustrates a block diagram illustrating an example packet switching device (or system) 1100 that can be utilized to implement various aspects of the technologies disclosed herein. In some examples, packet switching device(s) 1100 may be employed in various networks, such as, for example, WAN 106 as described with respect to FIG. 1.

In some examples, a packet switching device 1100 may comprise multiple line card(s) 1102, each with one or more network interfaces for sending and receiving packets over communications links (e.g., possibly part of a link aggregation group). The packet switching device 1100 may also have a control plane with one or more processing elements 1105 for managing the control plane and/or control plane processing of packets associated with forwarding of packets in a network. The packet switching device 1100 may also include other cards 1108 (e.g., service cards, blades) which include processing elements that are used to process (e.g., forward/send, drop, manipulate, change, modify, receive, create, duplicate, apply a service) packets associated with forwarding of packets in a network. The packet switching device 1100 may comprise hardware-based communication mechanism 1106 (e.g., bus, switching fabric, and/or matrix, etc.) for allowing its different entities 1102, 1104, and 1108 to communicate. Line card(s) 1102, may typically perform the actions of being both an ingress and/or an egress line card 1102, in regard to multiple other particular packets and/or packet streams being received by, or sent from, packet switching device 1100.

Figure 12:
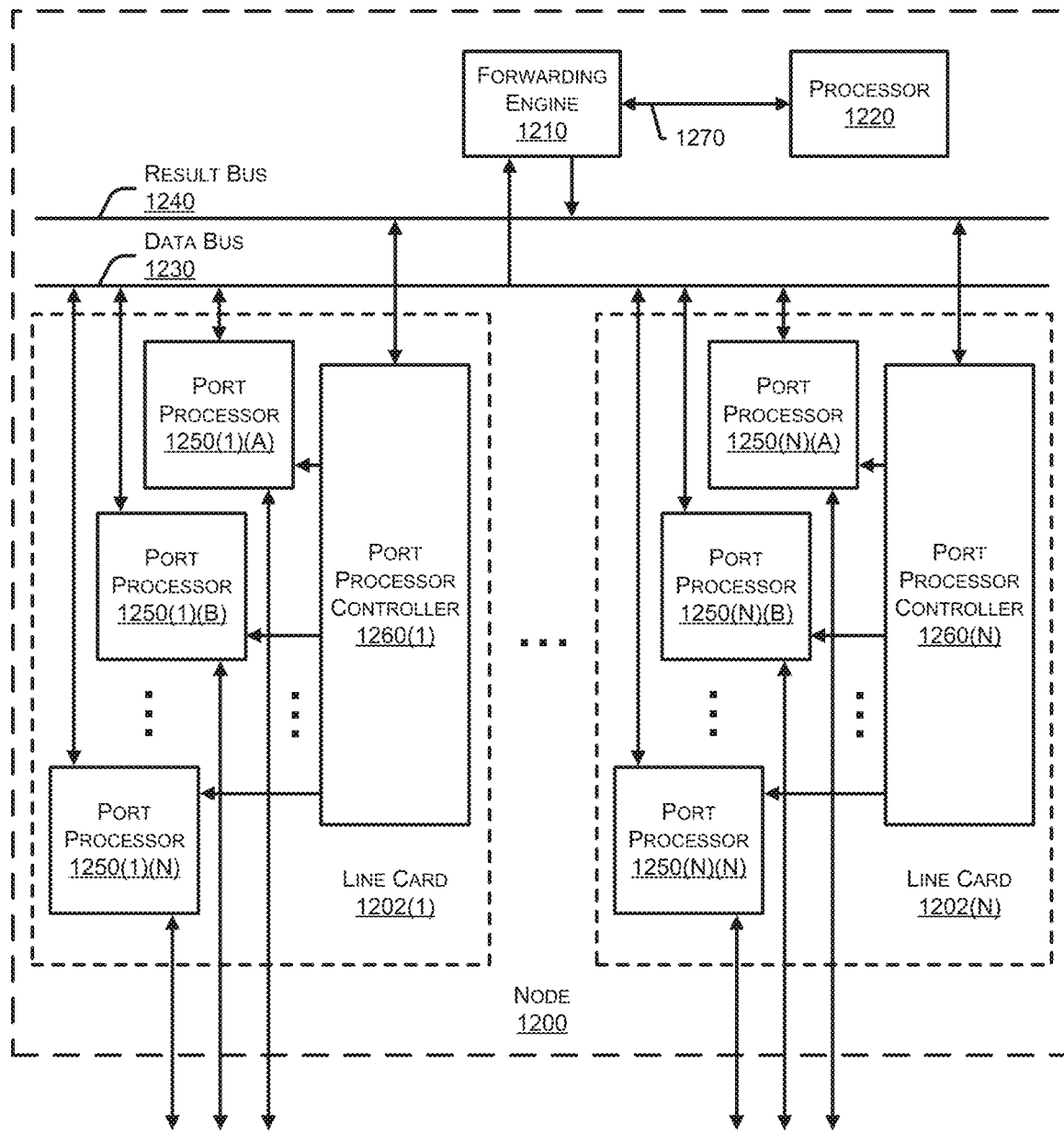
FIG. 12 illustrates a block diagram illustrating certain components of an example node that can be utilized to implement various aspects of the technologies disclosed herein.

FIG. 12 illustrates a block diagram illustrating certain components of an example node 1200 that can be utilized to implement various aspects of the technologies disclosed herein. In some examples, node(s) 1200 may be employed in various networks, such as, for example, WAN 106 as described with respect to FIG. 1.

In some examples, node 1200 may include any number of line cards 1202 (e.g., line cards 1202(1)-(N), where N may be any integer greater than 1) that are communicatively coupled to a forwarding engine 1210 (also referred to as a packet forwarder) and/or a processor 1220 via a data bus 1230 and/or a result bus 1240. Line cards 1202(1)-(N) may include any number of port processors 1050(1)(A)-(N)(N) which are controlled by port processor controllers 1260(1)-(N), where N may be any integer greater than 1. Additionally, or alternatively, forwarding engine 1210 and/or processor 1220 are not only coupled to one another via the data bus 1230 and the result bus 1240, but may also communicatively coupled to one another by a communications link 1270.

The processors (e.g., the port processor(s) 1250 and/or the port processor controller(s) 1260) of each line card 1202 may be mounted on a single printed circuit board. When a packet or packet and header are received, the packet or packet and header may be identified and analyzed by node 1200 (also referred to herein as a router) in the following manner. Upon receipt, a packet (or some or all of its control information) or packet and header may be sent from one of port processor(s) 1250(1)(A)-(N)(N) at which the packet or packet and header was received and to one or more of those devices coupled to the data bus 1230 (e.g., others of the port processor(s) 1250(1)(A)-(N)(N), the forwarding engine 1210 and/or the processor 1220). Handling of the packet or packet and header may be determined, for example, by the forwarding engine 1210. For example, the forwarding engine 1210 may determine that the packet or packet and header should be forwarded to one or more of port processors 1250(1)(A)-(N)(N). This may be accomplished by indicating to corresponding one(s) of port processor controllers 1260(1)-(N) that the copy of the packet or packet and header held in the given one(s) of port processor(s) 1250(1)(A)-(N)(N) should be forwarded to the appropriate one of port processor(s) 1250(1)(A)-(N)(N). Additionally, or alternatively, once a packet or packet and header has been identified for processing, the forwarding engine 1210, the processor 1220, and/or the like may be used to process the packet or packet and header in some manner and/or may add packet security information in order to secure the packet. On a node 1200 sourcing such a packet or packet and header, this processing may include, for example, encryption of some or all of the packet's or packet and header's information, the addition of a digital signature, and/or some other information and/or processing capable of securing the packet or packet and header. On a node 1200 receiving such a processed packet or packet and header, the corresponding process may be performed to recover or validate the packet's or packet and header's information that has been secured.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for processing network data objects, the method comprising:
   receiving network data objects, the network data objects including configuration data and operational data;
   separating the configuration data and operational data to generate a configuration data stream including time stamped configuration data objects and an operational data stream including time stamped operational data objects;
   generating a sliding window cache having a predetermined time length;
   temporarily caching the operational data objects in the sliding window cache based on timestamps of the operational data objects;
   generating a log database table for the sliding window cache, the log database table comprising log entries for the cached operational data objects, wherein the log entries each comprise an identifier associated with a cached operational data object's parent object class, an incremented number, and a timestamp associated with the cached operational data object;
   using the log database table for the sliding window cache to process queries for cached operational data objects occurring within the sliding window cache; and storing one or more of the cached operational data objects in memory when the timestamps of the cached operational data objects no longer occur within the sliding window cache.

2. The method as in claim 1, wherein the operational data comprises an append-only telemetry log.

3. The method as in claim 1, further comprising:
receiving a query for network data occurring for a query duration;
retrieving cached operational data objects from the sliding window cache that have timestamps within the query duration;
retrieving non-cached operational data objects having timestamps occurring outside of the sliding window cache based on the timestamps of the operational data objects; and
responding to the query with the retrieved cached operational data objects and retrieved non-cached operational data objects.

4. The method as in claim 3, further comprising responding to the query with operational data objects having timestamps occurring within the query duration.

5. The method as in claim 1, further comprising:
detecting a new operational data object;
retrieving cached operational data objects; and
delivering the new operational data object and the retrieved operational data objects to a subscription customer.

6. The method as in claim 5, further comprising delivering operational data to the subscription customer.

7. The method as in claim 1, further comprising storing the operational data objects in memory that includes an audit log database, an event log database, and an access log database.

8. A network data processing system comprising:
one or more processors; and
one or more non-transitory computer-readable media storing computer-executable instructions that, when executed by the one or more processors, cause the one or more processors to perform operations comprising:
receiving network data objects, the network data objects including configuration data and operational data;
separating the configuration data and operational data to generate a configuration data stream including time stamped configuration data objects and an operational data stream including time stamped operational data objects;
generating a sliding window cache having a predetermined time length;
temporarily caching the operational data objects in the sliding window cache based on timestamps of the operational data objects;
generating a log database table for the sliding window cache, the log database table comprising log entries for the cached operational data objects, wherein the log entries each comprise an identifier associated with a cached operational data object's parent object class, an incremented number, and a timestamp associated with the cached operational data object;
using the log database table for the sliding window cache to process queries for cached operational data objects; and
storing one or more of the cached operational data objects in memory when the timestamps of the cached operational data objects no longer occur within the sliding window cache.

9. The network data processing system as in claim 8, wherein the operational data comprises an append-only telemetry log.

10. The network data processing system as in claim 8, the operations further comprising:
receiving a query for network data occurring for a query duration;
retrieving cached operational data objects from the sliding window cache that have timestamps within the query duration;
retrieving non-cached operational data objects having timestamps occurring outside of the sliding window cache based on the timestamps of the operational data object; and
responding to the query with the retrieved cached operational data objects and retrieved non-cached operational data objects.

11. The network data processing system as in claim 8, the operations further comprising responding to a query with operational data objects having timestamps occurring within a query duration.

12. The network data processing system as in claim 8, the operations further comprising:
detecting a new operational data object;
retrieving cached operational data objects; and
delivering the new operational data object and the retrieved operational data objects to a subscription customer.

13. The network data processing system as in claim 8, the operations further comprising delivering configuration data to a customer.

14. The network data processing system as in claim 8, the operations further comprising storing the operational data objects in memory that includes an audit log database, an event log database, and an access log database.

15. One or more non-transitory computer-readable media storing computer-executable instructions that, when executed by one or more processors, cause the one or more processors to perform operations comprising:
receiving network data objects, the network data objects including configuration data and operational data;
separating the configuration data and operational data to generate a configuration data stream including time stamped configuration data objects and an operational data stream including time stamped operational data objects;
generating a sliding window cache having a predetermined time length;
temporarily caching the operational data objects in the sliding window cache based on timestamps of the operational data objects;
generating a log database table for the sliding window cache, the log database table comprising log entries for the cached operational data objects, wherein the log entries each comprise an identifier associated with a cached operational data object's parent object class, an incremented number, and a timestamp associated with the cached operational data object;
using the log database table for the sliding window cache to process queries for cached operational data objects; and
storing one or more of the cached operational data objects in memory when the timestamps of the cached operational data objects no longer occur within the sliding window cache.

16. The one or more non-transitory computer-readable media as in claim 15, wherein the operational data comprises an append-only telemetry log.

17. The one or more non-transitory computer-readable media as in claim 15, the operations further comprising responding to a query with configuration data objects having timestamps occurring within a query duration.

18. The one or more non-transitory computer-readable media as in claim 15, the operations further comprising:
- detecting a new operational data object;
- retrieving cached operational data objects; and
- delivering the new operational data object and the retrieved operational data objects to a subscription customer.

19. The one or more non-transitory computer-readable media as in claim 15, the operations further comprising delivering operational data to a customer.

20. The one or more non-transitory computer-readable media as in claim 15, the operations further comprising storing the operational data objects in memory that includes an audit log database, an event log database, and an access log database.

\* \* \* \* \*